United States Patent Office 2,794,787
Patented June 4, 1957

2,794,787

MODIFIED GELATINS OBTAINED BY POLYMERIZING AN ALKENYL CARBONAMIDE IN AN AQUEOUS GELATIN SOLUTION

Harry W. Coover, Jr., Kingsport, Tenn., assignor to Eastman Kodak Company, Rochester, N. Y., a corporation of New Jersey No Drawing. Application October 21, 1952,
Serial No. 316,066

3 Claims. (Cl. 260—8)

This invention relates to modified gelatins obtained by polymerizing acrylamide in a system containing gelatin.

The prior art has referred to mechanical mixtures of gelatin and certain acrylamides. Considerable difficulties are encountered in making such mixtures. For instance, most of the simple acrylamides are not readily compatible with gelatin and hence the physical mixture thereof will result upon coating in opaque films having poor physical properties. Also polymeric acrylamides have been found to be incompatible with gelatin. For instance, when polymerized acrylamides, even though completely water soluble, have been mixed with aqueous solutions of gelatin it has been found that the resulting mixture is not homogeneous and that coatings made therefrom dry down to give opaque, brittle films. This is true, for instance, when gelatin is mixed with poly-N-methylmethacrylamide or poly-N-isopropylacrylamide.

One object of my invention is to prepare compositions of matter in which gelatin is compatible with and modified by polymerized unsaturated acid amides. Another object of my invention is to produce modified gelatins which have a good protective colloid action for silver halides. A still further object of my invention is to provide a modified gelatin having a high peptizing action and which will retain finely divided materials such as pigments or silver halides dispersed in aqueous media. Other objects of my invention will appear herein.

My invention in its broadest aspects comprises the homopolymerization or copolymerization of an amide or half amide of an unsaturated acid in a system in which gelatin is also present. The resulting product exhibits products of homogeneity between the gelatin and the polymerized material indicating some sort of a bond between the gelatin and the polymerized amide or half amide. This is evidenced by the fact that clear, flexible films of good quality are obtained from the resulting product as distinguished from the opaque, brittle films obtained from physical mixtures of polymers of this type with gelatin.

The process of preparing modified gelatins as described herein is advantageously carried out either in an aqueous system or in a system in which solvents are employed which will dissolve both the monomer and the gelatin which is used. In the aqueous system type of polymerization the monomers where water soluble are dissolved in water containing gelatin in solution therein and the polymerization is carried out in the presence of a polymerizing catalyst at an elevated temperature. If the monomers are not soluble in water an emulsion may be formed thereof in water containing gelatin by means of a wetting agent such as sodium lauryl sulfate or the like and the polymerization may be carried out under the influence of heat and a catalyst. If desired, the preparation of modified gelatins in accordance with my invention may be carried out in some solvent other than water which is a solvent for both the monomer or monomers used and gelatin such as for example, N,N-dimethyl formamide or N,N-dimethylacetamide containing a small amount (such as 1–10%) of water therein. The polymerization may even occur at ordinary temperatures but due to the time necessary to complete the polymerization the use of an elevated temperature is desirable. The catalyst employed to promote the polymerization may be any catalyst which is recognized as being suitable for the polymerization of amides of unsaturated acids. The peroxides either organic or inorganic such as ammonium persulfate, sodium perborate, benzoyl peroxide, hydrogen peroxide or the like however have been found to be most convenient for catalyzing these polymerizations. If desired, a reducing agent may also be present forming a redox system type of catalyst. The composition of the materials to be reacted should constitute 10–90% of gelatin and 90–10% of the monomeric material which is to be polymerized, these percentages being based on the weight of the mixture of gelatin and the monomeric materials. It has been found that the product resulting from the polymerization described in which gelatin is present can be coated however either from the reaction mass in which it is prepared or by separating the gelatin-polymer therefrom, redissolving the same in a solvent therefor and coating out the same. The coatings thus obtained are clear, tough and flexible.

The polymerizable material which is employed in preparing modified gelatins in accordance with my invention may be either amides or half amides per se or amides or half amides mixed with other polymerizable materials, the latter being characterized by the structure —CH=C< therein. The amide or half amide should constitute 50–100% of the total polymerizable material employed. The amides which are suitable for use in preparing modified gelatins in accordance with my invention are acrylamide, methacrylamide, fumaramides, maleamides, citraconamides, itaconamides or the like. It is to be understood that these amides may be of the primary type in which two hydrogen constitutents are on the nitrogen of the amide group or one or both of those hydrogens of the amide group may be replaced by an alkyl or aryl group such as methyl, ethyl, isopropyl phenyl, or cresyl. The description of this invention with reference to the amides is also applicable where half amides are employed instead of the amides. Some of the half amides which may be employed in preparing modified gelatins in accordance with my invention are fumaramates, maleamates, citraconamates and itaconamates. Here again the amide group may be NH2 or it may be substituted as to either one or both of the hydrogens thereof by an alkyl or aryl group. If a copolymer or interpolymer is desired there may be employed along with the amide or half amide another amide or half amide or a monomer selected from the following group: alkyl acrylates, alkyl methacrylates such as methyl acrylate or methacrylate, acrylonitrile, methacrylonitrile, vinyl acetate, alkyl itaconates, alkyl fumarates, alkyl maleates or alkyl citraconates.

In the carrying out of the polymerization procedure the mechanical aspect thereof preferably involves slowly introducing the monomer or mixture of monomers into an aqueous solution of gelatin containing the polymerization catalyst and with or without emulsifying agents by spraying monomer or monomers into the gelatin solution from a fine jet or allowing it to run or drop into the solution while vigorously stirring or agitating and while heating or irradiating the same. The speed at which the monomers are to be introduced will depend upon the nature of the substances or mixtures to be polymerized, the temperature of the gelatin solution, etc. If desired the monomer or monomers may first be mixed with the aqueous gelatin and the polymerization then is carried out. The resulting product is ordinarily obtained in the form of a dispersion of the polymerization product intimately associated with the gelatin, in a form which it is not possible to obtain by the mere physical mixing of the polymer and the gelatin. The products obtained in accordance with my invention give clear compatible solutions which can be mixed to give clear films. In many cases the solubility properties of the gelatin are drastically changed, this depending, of course, upon the composition of the polymer which modified the gelatin. This polymer composition is selected to maintain the desired properties to the gelatin. For instance, if a gelatin coating is desired which will not be water soluble but will swell in water, a methacrylate and acrylamide may be copolymerized in the presence of gelatin and the resulting product after casting out as a film will lose its water solubility merely giving a swelling action in water. Also some compositions of acrylates and acrylamides when employed to modify gelatin in accordance with my invention will give a product when polymerized with gelatin from which may be prepared extremely tough gelatin films.

The following examples illustrate my invention.

Example 1

Five grams of N-methylacrylamide was dissolved in 100 ml. of water containing 10 g. of gelatin, 0.1 g. of ammonium persulfate and 0.1 g. of sodium bisulfite. The polymerization was completed by heating at 35° C. for 12 hours. The resulting clear solution could be cast into clear, tough films.

Example 2

Five grams of methacrylate and 5 g. of N-methylmethacrylamide were added to 100 ml. of water containing 10 g. of gelatin 0.3 g. of ammonium persulfate and 0.3 g. sodium bisulfite. Polymerization was completed by heating at 50° C. for 18 hours. Cast films of the resulting gelatin were clear and tough and not completely soluble in water.

Example 3

Two grams of N-methylacrylamide and 5 g. of acrylamide were dissolved in 100 ml. of water containing 5 g. of gelatin and 0.1 g. ammonium persulfate. Polymerization was completed by heating at 50° C. for 16 hours. Cast films of the resulting polymer were clear and tough.

Example 4

Three grams N-isopropylacrylamide and 1 g. acrylonitrile were added to 100 ml. of water containing 10 g. gelatin, 0.1 g. ammonium persulfate and 0.1 g. sodium bisulfite. The polymerization was completed by heating at 40° C. for 16 hours. The films cast from the resulting polymer were clear and tough.

Example 5

18 grams of fumaramide were added to 100 milliliters of water containing 2 grams of gelatin, 2 cc. of 7-ethyl-2-methyl undecane-4-sulfonic acid sodium salt (Tergitol No. 4), 0.1 gram of ammonium persulfate and 0.1 grams of sodium bisulfite. The polymerization was completed by heating at 35° C. for 16 hours. The films cast from the resulting polymer emulsion were clear and tough. The polymer contained 18.1 percent fumaramide by weight on analysis. The polymer was soluble in dimethyl formamide containing 10 percent water.

Example 6

16 grams of itaconamide were emulsified in 100 milliliters of water containing 4 grams of gelatin and 2 cc. of 7-ethyl-2-methyl undecane-4-sulfonic acid sodium salt (Tergitol No. 4). The emulsion was tumbled at 50° C. for 6 hours and cooled to room temperature. There was then added 0.5 gram of ammonium persulfate and 0.5 gram of sodium bisulfite. The polymerization was completed by heating at 40° C. for 12 hours. The resulting emulsion could be cast into films which were clear and tough. The resulting polymer contained 79.9 percent itaconamide based on analysis.

Example 7

7 grams of N,N'-dimethyl maleamide and 7 grams of vinyl acetate were emulsified in 100 cc. of water containing 6 grams of gelatin and 2 grams of potassium laurate. The emulsion was heated at 40° C. and tumbled for 3 hours. To the cooled emulsion, 0.3 gram of ammonium persulfate and 0.3 gram of sodium bisulfite were added. The polymerization was completed by heating at 35° C. for 8 hours. The films cast from the resulting emulsion were clear and tough. The polymer contained 34.9 percent N,N'-maleamide by weight based on analysis. The polymer was soluble in such solvents as N,N-dimethyl acetamide and N,N-dimethyl formamide containing 5 percent water.

Example 8

8 grams of N,N'-dimethyl citraconamide and 2 grams of acrylonitrile were emulsified in 100 milliliters of water containing 10 grams of gelatin, 2 grams of potassium laurate and 0.4 grams of ammonium persulfate. The polymerization was completed by heating at 50° C. for 12 hours. The films cast from the resulting emulsion were clear and tough. The resulting polymer was soluble in such solvents as dimethyl acetamide and dimethyl formamide containing 8 percent water and contained 40.1 percent N,N'-dimethyl citraconamide by weight based on analysis.

Example 9

6 grams of N-methyl methyl fumaramate and 2 grams of methacrylonitrile were emulsified in 100 milliliters of water containing 12 grams of gelatin, 1 gram of a sulfonated ether (Triton 720), 0.2 gram of ammonium persulfate and 0.1 gram of sodium bisulfite. The polymerization was completed by heating at 35° C. for 12 hours. The films cast from the resulting emulsion were clear and tough. The polymer was soluble in such solvents as N,N-dimethyl acetamide and N,N-dimethyl formamide containing 5 to 10 percent water. The resulting polymer contained 60 percent gelatin based on analysis.

Example 10

5 g. of methylitaconamide and 1 g. of dimethylmaleate were added to 100 milliliters of dimethylformamide containing 10 percent water. 14 g. of gelatin were then added and the reaction mixture was tumbled until the gelatin had completely dissolved. There was then added 0.5 g. of benzoyl peroxide. The polymerization was completed by heating at 50° C. for 16 hours. The resulting solution was cast to give clear, tough films. The resulting polymer contained 25 percent by weight of N-methylitaconamate based on analysis.

Example 11

2 g. of N-methyl methylmaleamate and 2 g. of dimethylmaleate along with 16 g. of gelatin were dissolved in 100 milliliters of N,N-dimethylacetamide containing 10 percent water. After the reactants were completely dissolved in the solvent, 0.1 g. of ammonium persulfate and 0.1 g. of sodium bisulfite were added. The polymerization was completed by heating at 40° C. for 16 hours. Films cast from the resulting solution were clear and tough. The polymer contained 10 percent by weight of N-methyl methylmaleamate based on analysis.

Example 12

1 g. of methylcitraconamate and 1 g. of dimethylitaconate were emulsified in 100 milliliters of water containing 18 g. of gelatin, 0.05 g. of ammonium persulfate and 0.05 g. of sodium bisulfite. The polymerization was completed by heating at 40° C. for 8 hours. The films cast from the resulting polymer emulsion were clear and tough. The polymer contained 89.6 percent by weight of gelatin based on analysis. The polymer was readily soluble in such solvents as dimethylacetamide and dimethylformamide containing 5 to 10 percent water.

Example 13

10 g. of N-methyl methylitaconamate were emulsified in 100 milliliters of water containing 10 g. of gelatin and 0.1 g. of ammonium persulfate. Polymerization was completed by heating at 55° C. for 14 hours. Films cast from the resulting polymer were clear and tough. The resulting polymer was soluble in such solvents as dimethylacetamide and dimethylformamide containing 5 to 10 percent water and were compatible in all proportions with gelatin in these solvents.

Example 14

7 g. of N-methyl methacrylamide and 1 g. of fumaramide were emulsified in 100 milliliters of water containing 10 g. of gelatin, 0.1 g. of ammonium persulfate, 0.2 g. of sodium bisulfite and 1 cc. of 7-ethyl-2-methylundecane-4-sulfonic acid sodium salt (Tergitol No. 4). The polymerization was completed by heating at 35° C. for 8 hours. Films cast from the resulting polymer emulsion were clear and tough. The resulting polymer was compatible in all proportions with gelatin in such solvents as dimethylacetamide and dimethylformamide containing 5 to 10 percent water.

Example 15

8 g. of N-isopropyl acrylamide and 1 g. of methylmaleamate were emulsified in 100 milliliters of water containing 11 g. of gelatin and 0.2 g. of sodium persulfate. The polymerization was completed by heating at 50° C. for 16 hours. Films cast from the resulting polymer were clear and tough. The polymer was soluble in such solvents as dimethylacetamide and dimethylformamide containing 5 to 10 percent water.

Example 16

4 g. of N,N-dimethylacrylamide and 1 g. of methylitaconamate were emulsified in 100 milliliters of water containing 15 g. of gelatin and 0.05 g. of ammonium persulfate. The polymerization was completed by heating at 50° C. for 12 hours. Films cast from the resulting polymer were clear and tough.

Example 17

3 g. of N,N-dimethylacrylamide and 3 g. of N-methyl methacrylamide were dissolved in 100 milliliters of water containing 14 g. of gelatin, 0.2 g. of ammonium persulfate and 0.1 g. of sodium bisulfite. The polymerization was completed by heating at 35° C. for 12 hours. The films cast from the resulting polymer were clear and tough.

I claim:

1. A method of modifying gelatin which comprises mixing one part thereof in aqueous solution with a peroxy catalyst and 1/9–9 parts of α,β-unsaturated alkenyl carbonamide selected from the group consisting of the acrylamides, methacrylamides, fumaramides, maleamides, citraconamides and the itaconamides in which each of the N-substituents in the amide groups thereof are selected from the group consisting of hydrogen, methyl, ethyl, isopropyl, phenyl and cresyl, heating the mass until a polymer is formed and coating out the mass so obtained onto a film-forming surface whereby a tough transparent gelatin film is obtained.

2. A method of modifying a gelatin which comprises mixing with an aqueous solution thereof, water soluble N-methyl acrylamide in the proportion of 1/9–9 times the gelatin and a peroxy catalyst, heating the mass until a polymer has formed and coating out the resulting mass in the form of a layer onto a film forming surface whereby a tough, transparent gelatin film is obtained.

3. A method of modifying gelatin which comprises mixing with an aqueous solution of 10 parts thereof, 5 parts of water soluble N-methyl acrylamide and a peroxy catalyst, heating the mass thus obtained until polymerization of the amide has occurred and subsequently coating out the mass thus obtained in the form of a layer onto a film forming surface whereby a tough, transparent gelatin film is obtained.

References Cited in the file of this patent

UNITED STATES PATENTS

| Number | Name | Date |
|---|---|---|
| 2,461,023 | Barnes et al. | Feb. 8, 1949 |
| 2,504,074 | Jones | Apr. 11, 1950 |
| 2,519,135 | Jacobson | Aug. 15, 1950 |
| 2,548,520 | Damschroder et al. | Apr. 10, 1951 |
| 2,594,293 | Cowan et al. | Apr. 29, 1952 |